Jan. 29, 1963

A. J. TAYLOR 3,075,910

NUCLEAR REACTORS

Filed Aug. 19, 1958

Inventor
Anthony J. Taylor
By
Pennie, Edmonds, Morton, Barrows & Taylor
Attorneys

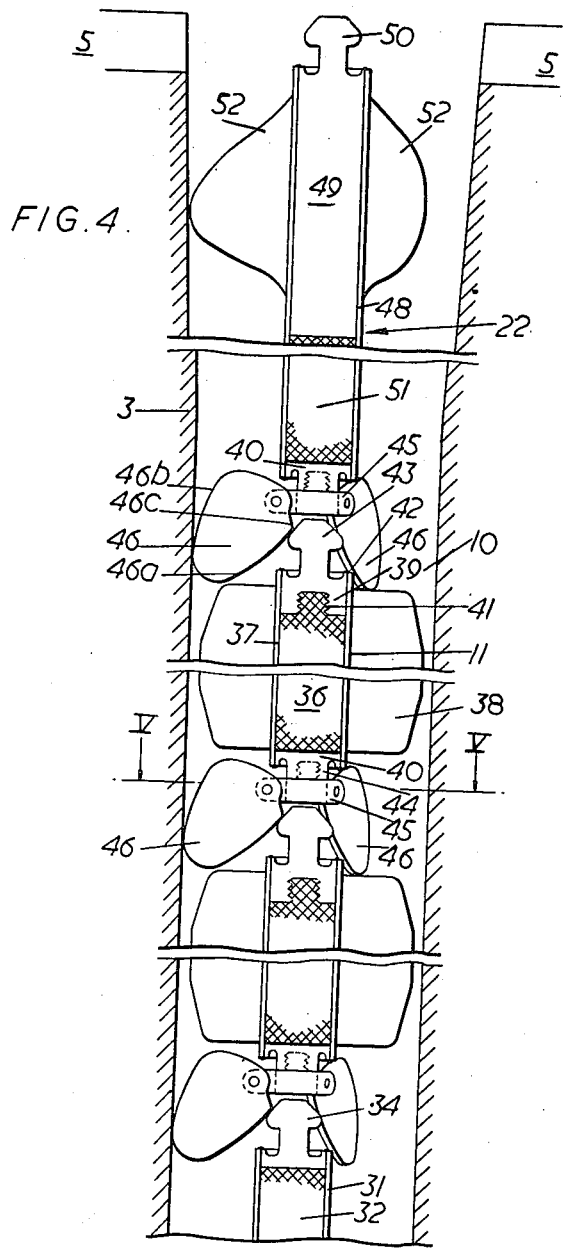

3,075,910
NUCLEAR REACTORS

Anthony J. Taylor, London, England, assignor to Babcock & Wilcox Limited, London, England, a British company
Filed Aug. 19, 1958, Ser. No. 755,922
Claims priority, application Great Britain Aug. 22, 1957
4 Claims. (Cl. 204—193.2)

This invention relates to nuclear reactors of the kind having a core which includes upright fuel channels containing withdrawable fuel elements and which is arranged to be fluid-cooled. More particularly the invention relates to nuclear reactors for use in ship propulsion.

When a nuclear reactor of the kind in question is installed in a ship it is subject to movements due to the pitching and rolling of the ship. Since the fuel elements are necessarily withdrawable from the fuel channels they must be designed to fit loosely within the channels. With such an arrangement, however, pitching and rolling produce rocking of the fuel elements in their channels and this is liable to lead to ill results.

In a fluid-cooled nuclear reactor the core of which includes means defining fuel channels containing withdrawable fuel elements, according to the present invention positioning means are provided for laterally supporting and firmly positioning the fuel elements against lateral movements in the fuel channels when the fuel elements are in their operative positions within the channels.

Thus, the invention includes a fluid-cooled nuclear reactor the core of which has upright fuel channels containing withdrawable fuel elements, wherein provision is made for laterally positioning the fuel elements in their channels, the means for laterally positioning a fuel element including movable positioning means operable firmly to position the element laterally in relation to the channel wall or to free the element from the channel wall.

The invention also includes a fuel element for use in a vertical fuel channel of a nuclear reactor, the fuel element being provided with movable positioning means operable from a position in which the means engages with the channel wall to position the element laterally to a position in which the element is free to move longitudinally of the channel.

By way of example, an embodiment of the invention will now be described with reference to the accompanying partly diagrammatic drawings in which:

FIGURE 4 shows on a still larger scale, in interrupted vertical axial section, the upper part of the fuel element channel lying above that shown in FIGURE 3.

Figure 1:
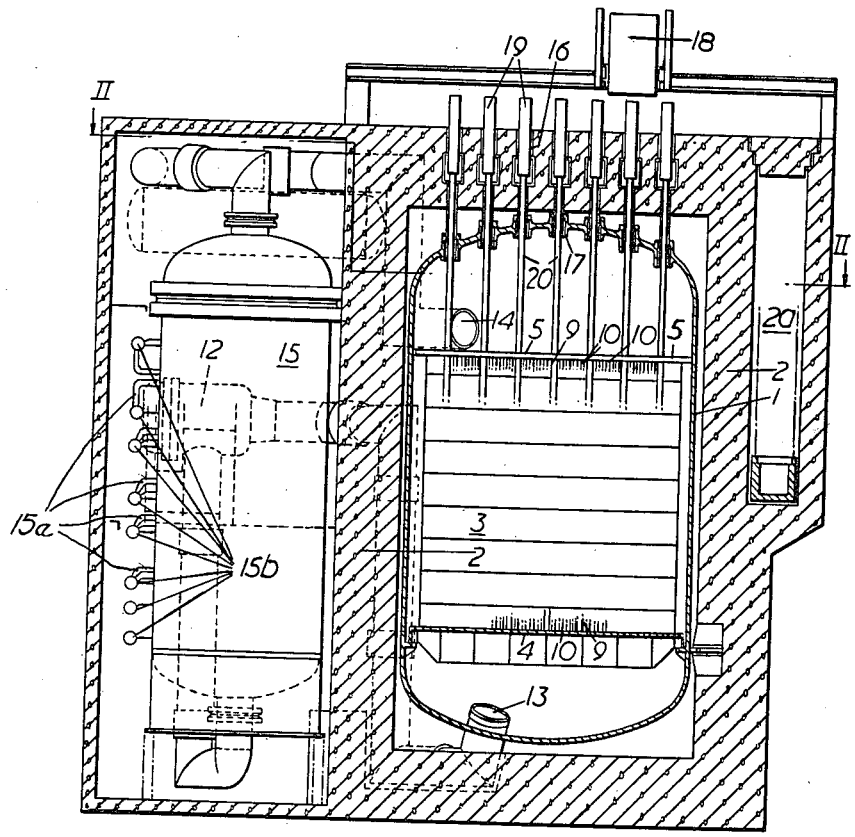
FIGURE 1 is a vertical section on the line I—I of FIGURE 2 of a gas-cooled nuclear reactor suitable for installation in a tanker.
Figure 2:
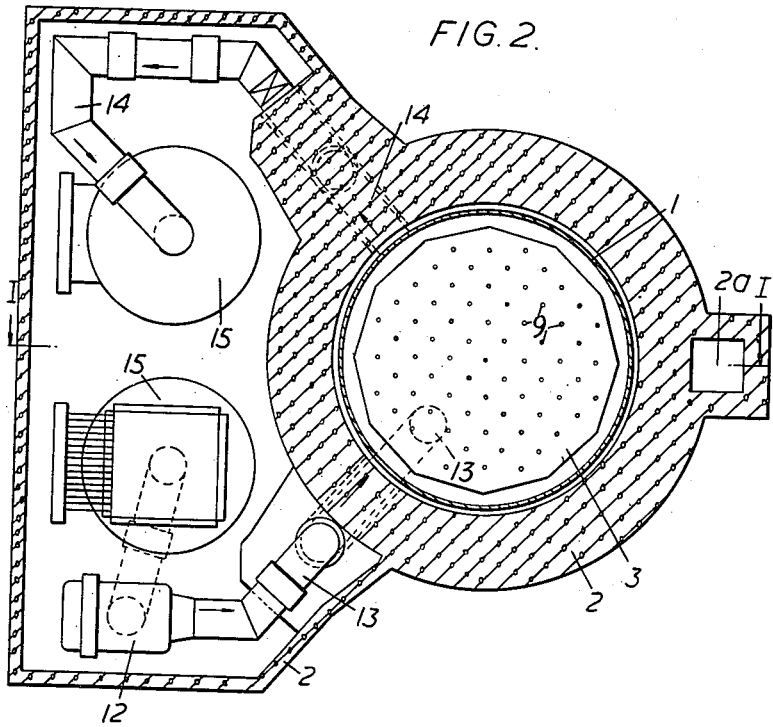
FIGURE 2 is a horizontal section on the line II—II of FIGURE 1.
Figure 3:
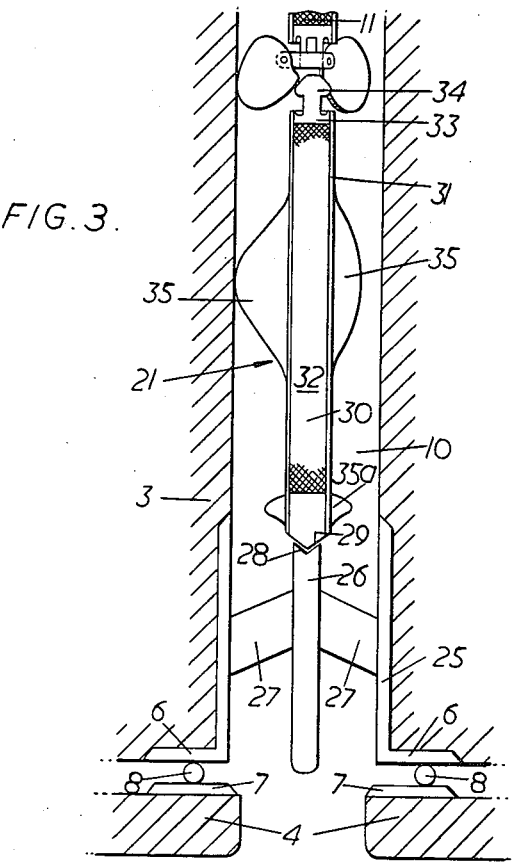
FIGURE 3 shows on an enlarged scale in vertical axial section the lower end of a fuel element channel of the reactor shown in FIGURES 1 and 2.

The nuclear reactor includes the pressure vessel 1 mounted in a known manner in the biological shield 2. The shield 2 is provided with a pond 2a into which ruptured fuel elements may be dropped. A graphite core 3 is mounted within the pressure vessel 1 between the steel diagrid 4 and the top plate 5. A detail of the method of supporting the carbon core 3 on the diagrid 4 to allow relative movement between them as a result of the heat developed in the reactor is shown in FIGURE 3. A bearing plate 6 is fixed to the bottom of the core 3 and a bearing plate 7 is fixed to the diagrid 4. Bearing balls 8 are interposed between the plates 6 and 7 so that the core 3 can roll on the balls 8 when the differential expansion occurs.

The core 3 is provided with passages 9 containing control rods and with passages 10 containing fuel elements 11 (see FIGURE 4). All the passages 9 and 10 extend from the top to the bottom of the core 3 and the fuel element passages 10 are disposed in clusters of sixteen on a square lattice around each control rod passage.

The reactor is cooled by $CO_2$ circulated by the pump 12. The $CO_2$ enters the bottom of the pressure vessel 1 through the inlet duct 13, passes upwardly through the passages in the reactor core 3 and leaves the pressure vessel 1 through the outlet duct 14. It is led by the duct 14 to the heat exchangers 15, in which horizontal heat exchanging tubes 15a are connected to headers 15b, and in which the heat of the $CO_2$ is used to raise steam. The cooled $CO_2$ is then recirculated by the pump 12.

The reactor is charged through the ports 16 in the biological shield 2 and the ports 17 in the pressure vessel 1 by means of the charging device 18 movable to any desired position over the top of the reactor core 3. In the drawing, the ports 16 are sealed by the plugs 19 from which tubes 20 leading to the control rod passages 9 in the core 3 depend.

The plugs 19 contain gear by means of which the control rods can be raised and lowered through the tubes 20 in the passages 9.

To load fuel elements 11 into the core 3, the plugs 19 and tubes 20 are removed and replaced by a charging chute of known form and not shown in the drawings. The charging chute includes a central stem which can fit into the upper end of a control rod passage 9 to locate it and a hollow limb pivoted at one end to the central stem and adjustable relatively thereto so that the other end of the limb can be caused to register with each in turn of the sixteen fuel element passages 10 surrounding the control rod passage 9. The hollow limb is such that a grab carrying a fuel element can pass through it.

Figure 5:
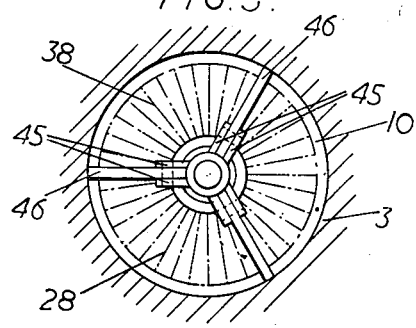
FIGURE 5 is a transverse section on the line V—V of FIGURE 4.

The form of the fuel elements 11 and their arrangement within a fuel element passage 10 is illustrated in FIGURES 3, 4 and 5. The elements 11 rest one upon another and the lowermost rests upon a supporting device indicated generally by 21 and shown in detail in FIGURE 3. A heavy retaining member, indicated generally by 22 and shown in detail in FIGURE 4, rests upon the uppermost of the fuel elements 11.

The supporting device 21 is inactive and is long enough—about 1 foot 9 inches in the embodiment shown—to ensure that substantially no radiation from the fuel element 11 above it can escape downwardly through the passage 10. The lower end of the passage 10 is lined with a steel sleeve 25 extending upwardly from the plate 6. A steel rod 26 is rigidly mounted within, coaxially with, the passage 10 by means of the spider 27. The upper end of the rod 26 is indented at 28 and the lower end 29 of a movable part 30 of the supporting device 21 is provided with a point to co-operate with the indent 28.

The movable part 30 comprises a magnesium tube 31 filled with graphite 32. The lower end 29 is in the form of a solid cap of magnesium. The upper end is closed by a further cap 33 of magnesium or Magnox provided with an upwardly extending boss 34. Three fins 35 extend radially outwardly from the tube 31 towards the wall of the passage 10 and thus serve to position the movable part 30 roughly centrally within the passage 10. A protuberance 35a encircles the lower end of the movable part 30 and serves to control the flow of coolant through the passage 10.

The fuel elements 11 are illustrated in detail in FIGURES 4–5. Each is approximately 2 feet 2 inches long and six rest one upon another in each passage 10. Each comprises a uranium bar 36 contained within a cylindrical can 37 of Magnox. Longitudinal fins 38, also of Magnox, extend radially outwardly from the can 37 and the outer edges of the fins 38 define a cylinder separated from the wall of the passage 10 by a significant gap. The upper end of each can 37 is closed by a cap 39 of Magnox and the lower end by a cap 40 of Magnox.

The upper caps 39 are each screwed at 41 on to a uranium bar 36 and are welded at 42 to the can 37. Each cap 39 is provided with an upwardly projecting boss 43, similar to the boss 34 provided on the supporting device 21.

Extending downwardly from each cap 40 is a projection 44 carrying a spider provided with three pairs of brackets 45 extending radially outwardly and separated from each other by equal angles. Pivotally mounted between each pair of brackets 45 is a lobe 46 of zirconium.

The lobes 46 could have any of a large range of profiles. The particular lobes 46 shown in the drawings are such that the inner surface 46a will co-operate with the boss 43, or 34, as the element provided with the lobes is lowered on to the boss to cause them to rotate outwardly so that the inner surface 46b engages the wall of the channel 10 with a cam action. The surface 46b is so designed that a strong camming action is obtained although it is preferable that the vertical distance between the point at which the surface 46b makes contact with the wall of the channel 10 is small to prevent the reaction between the wall and the surface from exerting a moment tending to cause the lobes 46 to rotate inwardly and so lift the element.

The centre of gravity of each lobe 46 is such that as each element is raised, the lobes 46 which it carries will swing downwardly to positions in which they lie entirely within the cylinder defined by the outer straight edges of the fins 38. They will thus lie in positions in which they do not interfere with the free movement of the fuel element along the channel 10. To ensure, however, that the lobes are splayed apart sufficiently for the boss 43, or 34, to enter between them, the surface 46a is provided with a shoulder 46c which can engage with the lower end of the cap 40 to limit the inward movement of the lobe 46.

When the elements 11 are lowered on to each other within the channels 10, the lobes 46 will come into contact with a boss 43 (or in the case of the lowermost fuel element 11, with the boss 34) they will be splayed apart until their edges come into contact with the wall of the passage 10. The weight of the element 11 will ensure that the lobes 46 remain in tight contact with the wall by a cam action, thus centering the end of the fuel element 11 that is provided with the lobes 46 and the upper end of the element 11 (or in the case of the lowermost fuel element, the supporting device 21) on which it rests. In this way the fuel elements 11 are firmly positioned and located against lateral movement.

The fuel elements 11 are retained in position against the force of coolant rising upwardly through the channels 10 by the retaining member 22 which, in the embodiment illustrated is about 1 foot 9 inches long. It comprises a magnesium sleeve 48 provided at its lower end with a cap 40 carrying lobes 46 similar to those provided at the lower end of each fuel element 11. The upper end of the sleeve 48 is closed by a heavy long closure 49 of steel provided with a boss 50 similar to the bosses 34 and 43. The space between the closure 49 and the lower cap 40 is filled with graphite 51. The sleeve 48 is provided with fins 52 which serve to centre the retaining member 22. The centering resulting from these fins 52 is only approximate but since the member 19 is inactive, this is immaterial. However, the lobes 46 at its lower end ensure that this end and the upper end of the fuel element 11 immediately beneath it is properly centred.

The member 22 is sufficiently long to ensure that substantially no radio-active particles can escape upwardly through the passage 10 from the fuel elements 11 beneath it. The walls of the passage 10 are flared in the region of the member 22 to provide a funnel to facilitate the insertion of the various components into the passage 10.

It will be realised that the bosses 34, 43 and 50 provide a convenient means whereby the various components can be gripped by a grab in charging and unloading.

I claim:

1. In a fluid-cooled nuclear reactor including a core; upright smooth-walled fuel channels provided within the core; and withdrawable fuel elements resting one upon another within the channels; the improvement comprising fuel element positioning means positioning the adjacent ends of each two adjacent fuel elements and including a plurality of wedge members pivotally connected to the lower end of, and distributed around the axis of, the upper of the two adjacent elements to swing outwardly of the longitudinal axis of the fuel element, and a boss provided on the upper end of the lower of the two adjacent elements and cooperating with said wedge members to wedge them between the boss and the wall of the fuel channel.

2. In a fluid-cooled nuclear reactor as set forth in claim 1, said boss including means adapted to be engaged by a grab.

3. A fuel element for use in an upright smooth-walled channel in the core of a nuclear reactor including a body of nuclear fuel; a plurality of wedge members distributed around the lower end of the body; pivot means connecting each of the wedge members to the body to hang normally downwardly; and actuating means at the upper end of the body for splaying the wedge members of an adjacent fuel element such that when the lower end of one of two similar fuel elements is lowered on to the upper end of the other, the actuating means at said upper end acts upon the wedge members provided at said lower end to wedge them into channel wall engaging positions.

4. A fuel element casing for enclosing a body of nuclear fuel to be positioned within a smooth-walled nuclear reactor fuel channel in end-to-end engagement with similar fuel element casings, the fuel element casing including a plurality of lobes distributed about one end portion of the casing, means connecting each lobe to said one end portion of the casing for swinging movement outwardly of the longitudinal axis of the casing, and wedging means at the other end portion of the casing for wedging the lobes of an adjacent fuel element casing outwardly against the walls of the nuclear reactor fuel channel and to centrally position the casings within the channel.

References Cited in the file of this patent

UNITED STATES PATENTS

| 2,491,692 | Shimek | Dec. 20, 1949 |
| 2,863,815 | Moore et al. | Dec. 9, 1958 |
| 2,877,170 | Greenhalgh et al. | Mar. 10, 1959 |

FOREIGN PATENTS

| 779,408 | Great Britain | July 17, 1957 |
| 783,094 | Great Britain | Sept. 18, 1957 |
| 784,890 | Great Britain | Oct. 16, 1957 |